US012761904B2

(12) United States Patent
Rajaraman et al.

(10) Patent No.: US 12,761,904 B2
(45) Date of Patent: Oct. 13, 2026

(54) METHOD AND SYSTEM FOR FOTA UPDATE FOR HIGHER PERFORMANCE MCU WITH EXTERNAL FLASH

(71) Applicant: TEXAS INSTRUMENTS INCORPORATED, Dallas, TX (US)

(72) Inventors: Sai Karthik Rajaraman, Frisco, TX (US); Mihir Narendra Mody, Bangalore (IN); Prithvi Y.A., Bangalore (IN); Deepshikha Gusain, New Delhi (IN); Niraj Nandan, Frisco, TX (US); Mohd Asif Farooqui, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 322 days.

(21) Appl. No.: 18/659,615

(22) Filed: May 9, 2024

(65) Prior Publication Data

US 2025/0147752 A1 May 8, 2025

Related U.S. Application Data

(60) Provisional application No. 63/547,181, filed on Nov. 3, 2023.

(51) Int. Cl.
*G06F 8/65* (2018.01)
*G06F 8/654* (2018.01)

(52) U.S. Cl.
CPC .................................... *G06F 8/654* (2018.02)

(58) Field of Classification Search
CPC ....................................................... G06F 8/654
See application file for complete search history.

(56) References Cited

U.S. PATENT DOCUMENTS

2007/0245092 A1* 10/2007 Yeh ..................... G06F 12/1458 711/147
2008/0046877 A1* 2/2008 Ford ....................... G06F 8/656 717/168
2012/0324246 A1* 12/2012 Rahardjo .................. G06F 1/26 713/300
2016/0085541 A1* 3/2016 Stenfort .................... G06F 8/65 717/170
2020/0183594 A1* 6/2020 Gyllenskog ........ G11C 16/3431
2021/0026620 A1* 1/2021 Rosner .................... G06F 8/654
2023/0185581 A1* 6/2023 Huang ................ G06F 12/0638 718/102
2023/0342292 A1 10/2023 Govindarajan et al.

* cited by examiner

*Primary Examiner* — Henry Tsai
*Assistant Examiner* — Harry Z Wang
(74) *Attorney, Agent, or Firm* — Michelle F. Murray; Charles F. Koch

(57) ABSTRACT

Systems and methods for updating firmware may include using wait states to reduce or eliminate polling by an executing firmware component. An example includes dedicated firmware update hardware logic components, including a firmware update processing unit that executes firmware update code. The firmware update code may be paused between request of a hardware event and completion of a hardware event and under control of one or more of the hardware logic components. Once a hardware event has been completed, a hardware logic component may determine completion and, in response, restart execution of the firmware update code.

20 Claims, 5 Drawing Sheets

METHOD AND SYSTEM FOR FOTA UPDATE FOR HIGHER PERFORMANCE MCU WITH EXTERNAL FLASH

CROSS-REFERENCE TO RELATED APPLICATIONS

The present application claims the benefit of U.S. Provisional Patent Application 63/547,181, filed Nov. 3, 2023, the disclosure of which is hereby incorporated herein by reference.

TECHNICAL FIELD

The present disclosure relates generally to updating firmware and, more specifically, to updating chip firmware during concurrent system operation by firmware logic that is put in wait states.

BACKGROUND

Some computing systems currently receive updated firmware over the air (FOTA). The purpose of firmware updates may be to add or remove features, to apply or remove patches, fix bugs, and/or the like. Some applications may apply such updates during system startup (e.g., boot) or during system shut down (e.g., key off). To reduce overall downtime to the system during the update, some computing systems may be updated without interrupting other system operation. However, updating firmware during concurrent system operation may lead to noticeable latency or low performance. There is a need for more efficient techniques for updating firmware.

SUMMARY

In one example, a method includes: updating system on-chip (SoC) firmware, during concurrent system operation, by firmware logic executed by a first processing unit of the SoC, including: initiating a first data write operation to a memory via a memory controller, wherein the first data write operation is configured to write a page of first firmware code to a first bank of the memory; controlling first hardware logic to change the memory controller to a first memory controller setting used by the firmware logic to write to the memory; entering and exiting a wait state under control of second hardware logic; subsequent to exiting the wait state, controlling the first hardware logic to change the memory controller to a second memory controller setting used by a second processing unit to read second firmware code from a second bank of the memory; polling the memory for completion of the first data write operation; and subsequent to the polling, determining that a response to the polling indicates completion of the first data write operation.

In another example, a system-on-chip (SoC) includes: a central processing unit (CPU) coupled to an interconnect; a microcontroller unit (MCU); and a memory controller coupled to the MCU and the interconnect, the memory controller being coupled to memory and being configured to read from and write to the memory; wherein the MCU is configured to access computer-readable code, which when executed by the MCU causes the MCU to update firmware stored on the memory, including: control first hardware logic on the SoC to receive access to a bus, wherein the bus is shared with the CPU and is coupled to the memory controller; enter a wait state, under control of second hardware logic on the SoC, during a time in which the first hardware logic operates to receive access to the bus; and exit the wait state, under control of the second hardware logic, upon access to the bus being received.

In yet another example, a system includes: a central processing unit (CPU) coupled to an interconnect; a microcontroller unit (MCU), including computer-readable code, which when executed by the MCU causes the MCU to update firmware stored on the memory; a memory controller coupled to the MCU and the interconnect, the memory controller being coupled to memory and being configured to read from and write to the memory; and hardware logic in communication with the MCU and configured to: receive a first instruction from firmware logic running on the MCU to access a bus, wherein the bus is shared with the CPU and is coupled to the memory controller; cause the firmware logic running on the MCU to enter a wait state coinciding with a time in which the hardware logic operates to receive access to the bus; and cause the firmware logic running on the MCU to exit the wait state in response to access to the bus having been received.

BRIEF DESCRIPTION OF THE DRAWINGS

Figure 1:
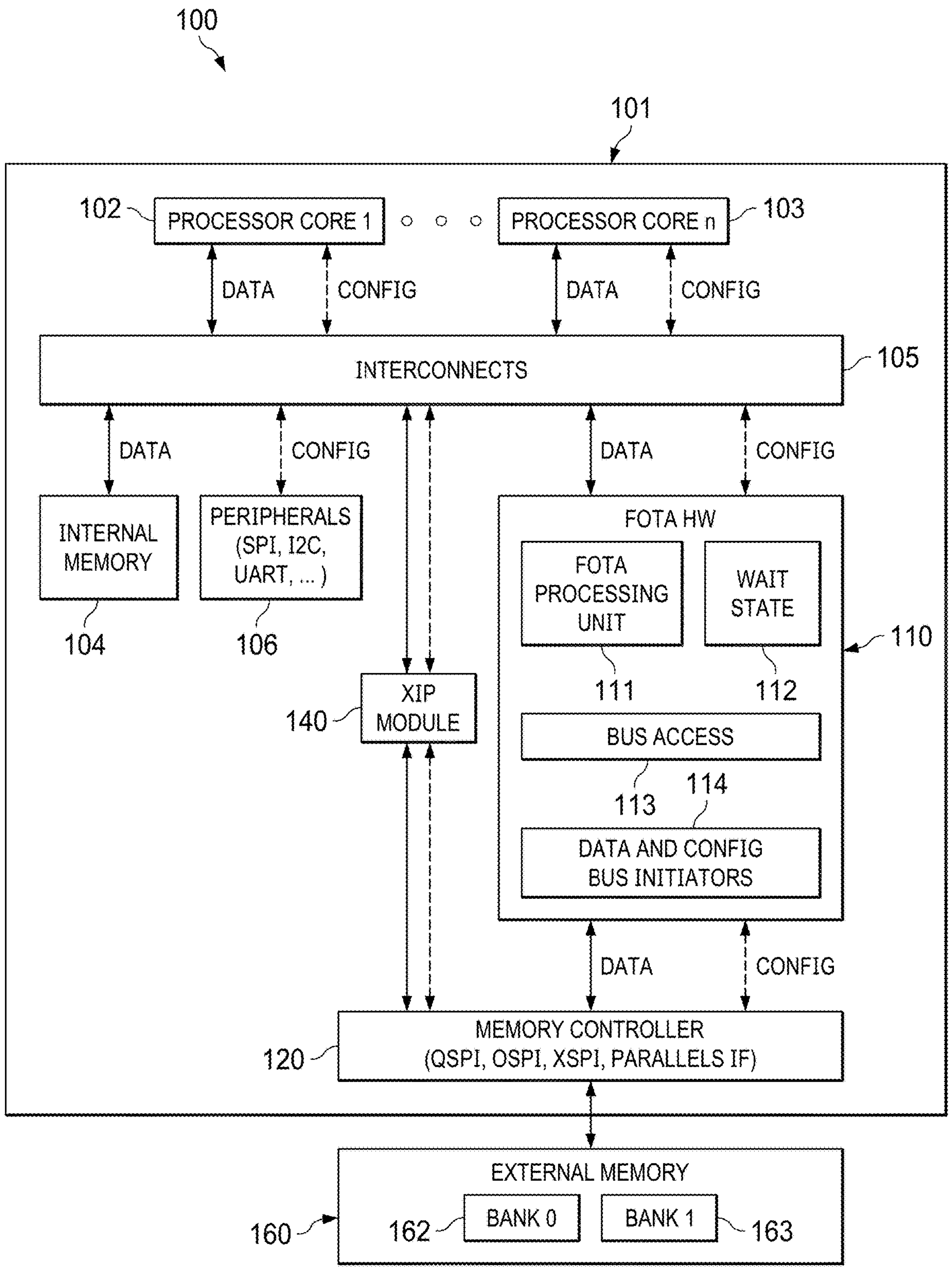

Having thus described the invention in general terms, reference will now be made to the accompanying drawings, wherein:

FIG. 1 is an illustration of an example system, having a hardware module for firmware updates, according to various embodiments.

Figure 2:
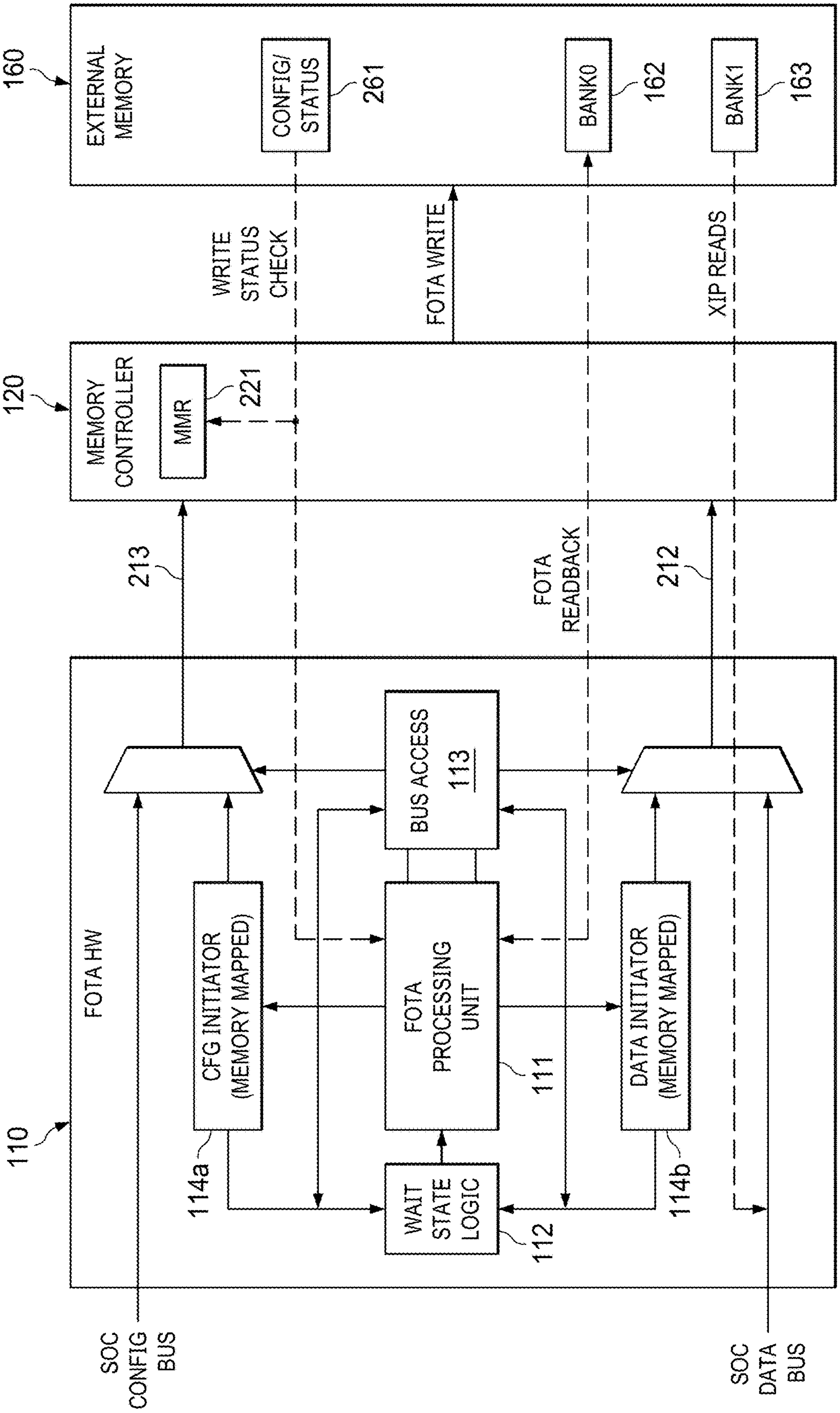

FIG. 2 is an illustration of various functional components of the system of FIG. 1, according to various embodiments.

Figure 3:
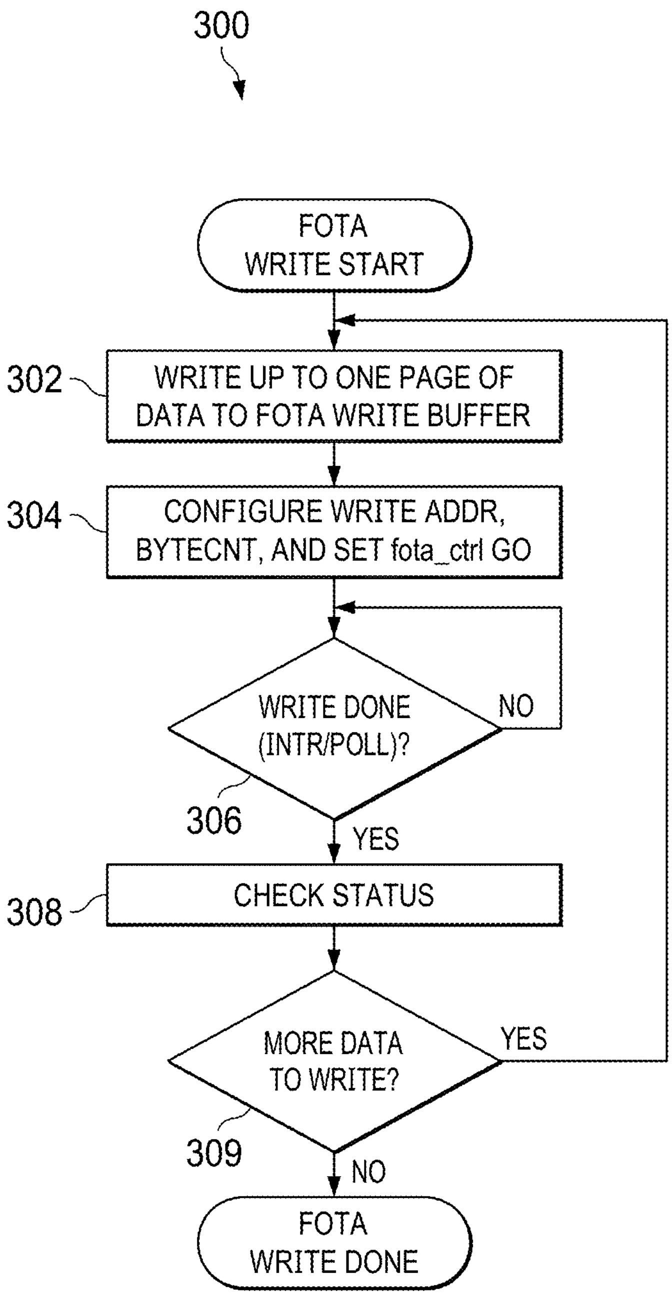

FIG. 3 is an illustration of an example method to update firmware, such as may be performed by a system on chip (SoC) central processing unit (CPU), according to various embodiments.

Figure 4:
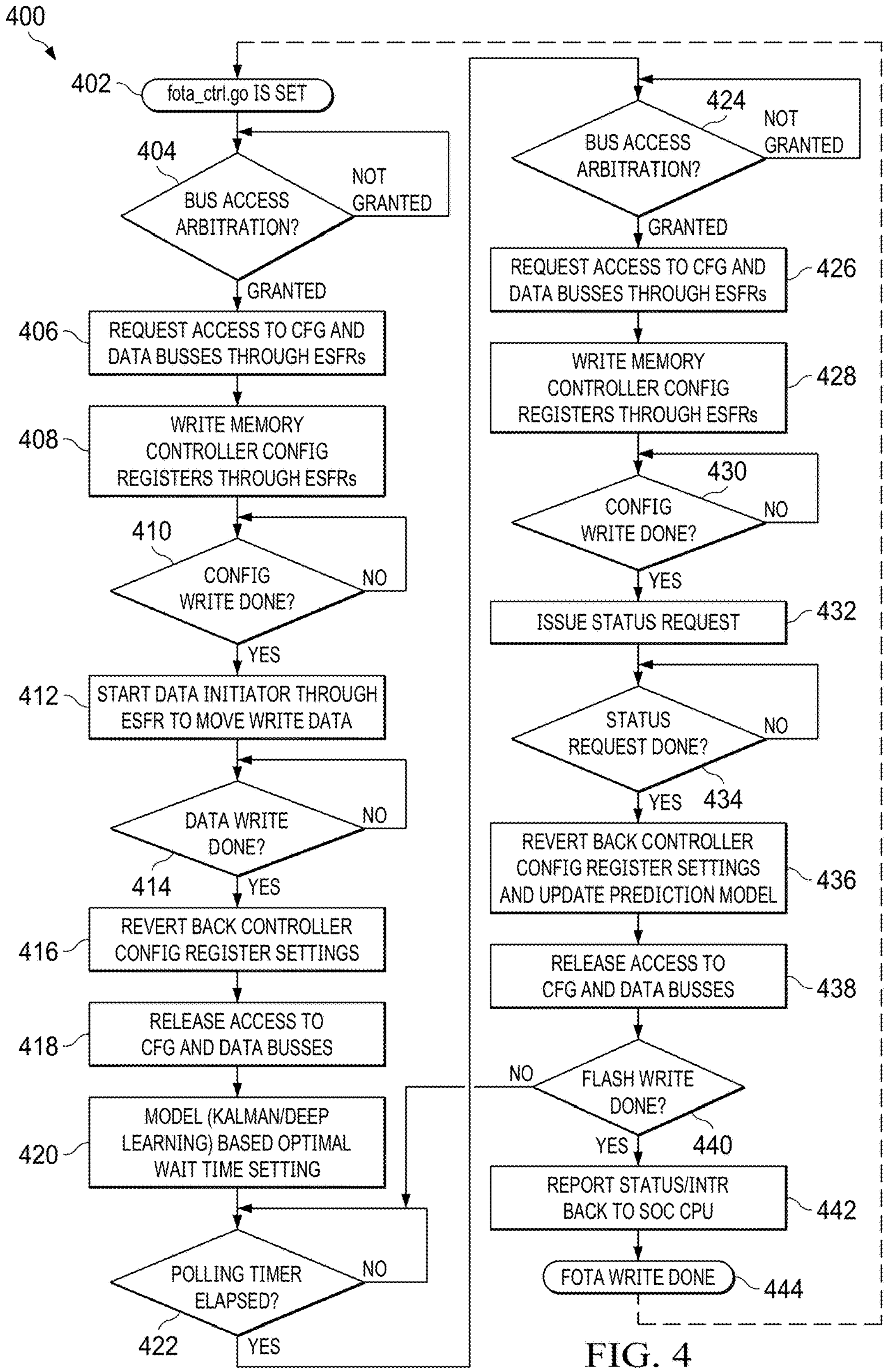

FIG. 4 is an illustration of an example method to update firmware, such as may be performed by a microcontroller unit (MCU) for FOTA, according to various embodiments.

Figure 5:
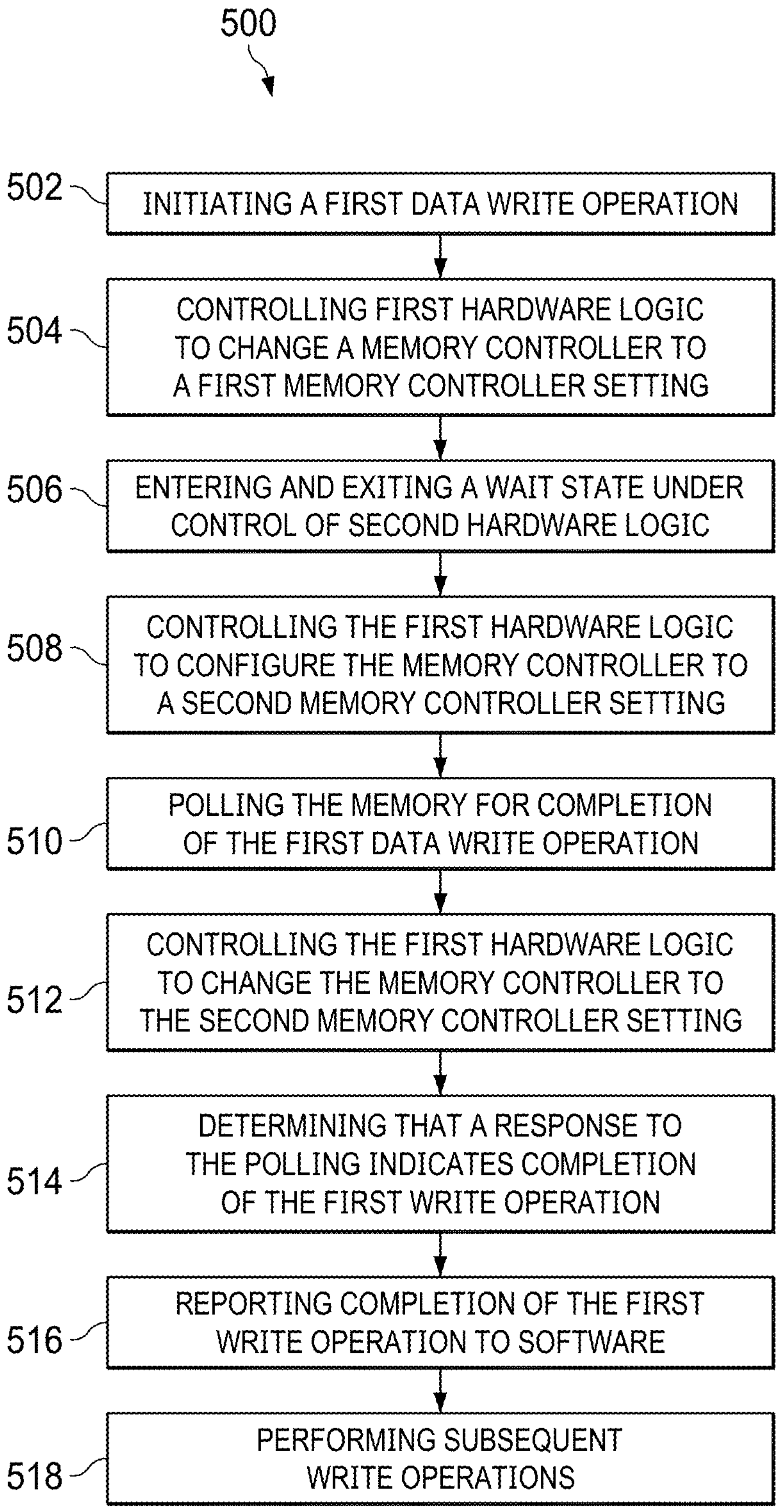

FIG. 5 is an illustration of an example method to update firmware, according to various embodiments.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Corresponding numerals and symbols in the different figures generally refer to corresponding parts, unless otherwise indicated. The figures are not necessarily drawn to scale. In the drawings, like reference numerals refer to like elements throughout, and the various features are not necessarily drawn to scale.

Some automotive and industrial microcontroller systems are moving to an architecture that includes multiple, smaller microcontroller units, other cores, and/or supporting circuitry consolidated into a single integrated circuit such as a system on a chip (SoC). The SoC may be manufactured using advanced processing nodes to support higher processor core speeds. However, attempting to implement embedded flash memory using these process nodes may be costly and difficult in some instances and, thus, some applications minimize the embedded flash memory by utilizing an SoC manufactured using a smaller process node coupled to an external flash memory manufactured using a larger (and cheaper) process node. Some example SoCs may execute code directly from the external flash memory using a process called execute in place (XIP) without necessarily copying the code to a volatile memory within the SoC.

Some such SoCs may receive updated firmware over the air (FOTA) for system updates for storage on the external flash memory. Accordingly, the external flash memory coupled to some such SoCs may have least two memory banks, where one memory bank may store an older copy of the firmware code currently being used for system operation, and the other memory bank may be written to with the newer copy of the firmware. As a result, the FOTA update may be performed during system operation.

Various embodiments may facilitate an FOTA update during system operation by employing a dedicated FOTA processing unit. For instance, the system may be implemented as a system on-chip (SoC) having multiple processor cores and an additional FOTA processing unit, which is separate from the processor cores. The FOTA processing unit may include, e.g., a microcontroller unit (MCU) or other appropriate processing unit that may execute computer-readable code to perform FOTA operations.

In one use case example, the processor cores of a system are currently executing a first copy of the firmware stored in a first bank of external flash memory when a first processor core receives a set of firmware update instructions and a second copy of the firmware. The first processor core may operate in coordination with the FOTA processing unit to store the second copy of the firmware in a second bank of the external flash memory. To do so, the first processor core and/or the FOTA processing unit may reconfigure a memory controller setting that was used by the first processor core s to read the first copy of the firmware from the first bank to be able to write to the second bank.

In some such examples, the FOTA processing unit may provide a data write operation to write a portion of the firmware to the second bank. The hardware logic may then cause the firmware update logic to wait for a timer to elapse before attempting to determine whether the data write operation completed. The timer may be adaptively set to be approximately as long as an amount of time taken to finish the data write operation. Subsequent to the timer elapsing, the FOTA processing unit may configure the memory controller to a setting used to write to the memory, thereby allowing the FOTA processing unit to poll the memory for completion of the first data write operation. After the polling, the FOTA processing unit may then revert the memory controller to the memory controller setting used by the remainder of the system to read from the first memory bank that stores the first (older) copy of the firmware.

According to the example above, the FOTA processing unit waits to poll during a time in which the data write operation was being completed. Time to complete a write operation may vary depending on age of the device, operating temperature, and the like. In other words, write operation duration may be variable rather than fixed. In this example, the duration of the timer is set based on historical data or other relevant data so that it approximately matches an expected duration of the write operation. An advantage of such example is that the FOTA update process may avoid over-polling, which may interrupt the XIP operation, and may avoid under-polling, which may cause the FOTA processing unit to unnecessarily delay initiating a subsequent write operation. In other words, the length of the timer may be intelligently set so as to balance read operations and write operations, thereby increasing efficiency of the system.

After the last portion of the second copy of the firmware has been successfully written to the second bank, and after the memory controller settings have been reconfigured to support read operations, the first processor core may then read the second (updated) copy of the firmware from the second bank.

According to a further example, the FOTA processing unit of the SoC includes hardware logic that operates with FOTA firmware update instructions to enter and exit wait states appropriately. For instance, the FOTA firmware update instructions may control hardware logic to cause an action to occur, and hardware logic may put the FOTA processing unit in a wait state during a time in which the action is being carried out. The hardware logic may have access to buses that carry signals, those signals indicating when an action has been completed. Therefore, the hardware logic may cause the FOTA processing unit to exit the wait state upon receipt of an appropriate hardware-level signal. As a result, the FOTA processing unit does not poll for completion of some actions (e.g., memory controller configuration setting changes, bus access changes, and the like). By contrast, implementing FOTA update instructions in software running on a CPU may instead result in polling for completion of actions, where that polling may be expected to cause XIP operation downtime. In other words, the embodiment using the FOTA processing unit and FOTA firmware wait state logic may reduce an amount of polling and thereby reduce an amount of XIP operation downtime. Decreased XIP operation downtime may lead to reduced latency during system operation.

FIG. 1 is an illustration of an example system 100, having example FOTA hardware 110, according to various embodiments. The example system includes a system-on-chip (SoC) 101 coupled to an external memory 160, which may be implemented as Flash memory or other appropriate memory hardware. According to some embodiments, the SoC 101 may include multiple (n) processing cores 102-103. External memory 160 may include non-transitory memory, flash memory, ferroelectric random-access memory (FeRAM), magnetic random-access memory (MRAM), phase-change memory (PCM), resistive random-access memory (RRAM), etc. or may be another memory type for which lower latency memories are available in a memory hierarchy. External memory 160 may store data, instructions for execution by the processing cores 102-103, configuration information, and/or other suitable information.

In the example of FIG. 1, external memory 160 may include multiple memory banks 162 and 163, with a first memory bank (e.g., bank 163) being designated to store a first copy of SoC firmware for use during operation of the SoC 101 and a second memory bank (e.g., bank 162) being designated, during a firmware update, to receive and store a newer second copy of the SoC firmware. After the firmware update, the newer copy may become the current copy and the second memory bank (e.g., bank 162) may be designated for use during operation of the SoC 101. The processing cores 102-103 may execute instructions contained within the current SoC firmware from the respective memory bank using XIP techniques (via XIP module 140) and/or by copying the instructions to a volatile memory such as internal memory 104.

Additionally, in some embodiments, the external memory 160 may include Read While Write (RWW) functionality to allow reads and writes to be executed simultaneously within external memory 160. In one example of RWW functionality, memory controller 120 may send read data before write completion and later polling is done to check for write data completion within external memory 160. RWW may be facilitated using memory partitioning inside, e.g. one partition for reads and another for writes within external memory 160. The selection of memory bank may be based on memory address.

SoC 101 may be fabricated on a semiconductor die and may be included within a semiconductor package in some implementations. Further, the external memory 160 may be part of a separate semiconductor die or semiconductor package. However, the scope of implementations is not limited to any particular physical architecture for chip and package structures.

In addition to executing firmware instructions directly from the external memory 160, the processing cores 102-103 may execute software code from internal memory 104, which may include copying the instructions from the external memory 106 to the internal memory 104. The instructions stored in internal memory 104 may include parts of one or more software programs. Software programs may be developed, encoded, and compiled in a variety of computing languages for a variety of software platforms and/or operating systems and subsequently loaded and executed by processing cores 102-103. In some embodiments, the compiling process of the software program may transform program code written in a programming language to another computer language such that the processing cores 102-103 are able to execute the programming code. For example, the compiling process of the software program may generate an executable program that provides encoded instructions (e.g., machine code instructions) for processing cores 102-103 to accomplish specific, non-generic, particular computing functions. The encoded instructions may be loaded as computer-executable instructions from internal memory 104.

The SoC 101 may also include an execute-in-place (XIP) module 140 to execute instructions stored in the external memory 106 without necessarily storing them in the internal memory 104 first. Generally, the XIP module 140 is a functional block that acts as a proxy for requests from the processing cores 102-103 to regions of memory, such as external memory 160 or the like. XIP module 140 may facilitate read operations on behalf of the cores 102-103 during runtime, thereby allowing the cores 102-103 to execute code that is stored to the external memory 160. As described in more detail below, the read operations attributable to XIP module 140 may compete for memory controller resources with the FOTA hardware 110. For instance, when the FOTA hardware 110 performs a read operation or changes a configuration setting of the memory controller 120, that may cause the XIP read operations to be paused.

The processor cores 102-103 are communicatively coupled to various other components via the interconnects 105. In some examples, the interconnects 105 may be separate for configuration signals and for data signals, though in other embodiments, the interconnects may be common for data and configuration signals. Interconnects 105 may include a multitude of buses or other signal-conducting components to allow the various components to communicate with each other. For instance, the processor cores 102-103 may be communicatively coupled to internal memory 104, FOTA hardware 110, XIP module 140, memory controller 120, and peripherals (e.g., external memory 106) via interconnects 105.

In this example, FOTA hardware 110 is physically separate from the processor cores 102-103. For instance, FOTA hardware 110 may be dedicated FOTA update hardware, separate and apart from processor cores 102-103, which may be more general in their operation.

Memory controller 120 (e.g., a Flash controller) may include hardware logic that is coupled with external memory 160 to provide lower-level hardware control over external memory 160. For instance, memory controller 120 may receive instructions from FOTA hardware 110 or XIP module 140 to read or write to the external memory 160. In one example, processor cores 102-103 may perform read and write operations to the external memory 160 via XIP module 140. Memory controller 120 may operate according to any appropriate protocol, such as Quad serial peripheral interface (SPI), Octal SPI, XSPI, parallel interface, or the like.

FOTA hardware 110 may be implemented on SoC 101 as hardware logic. For instance, FOTA hardware 110 may include a microcontroller unit (MCU), a CPU, or other appropriate processing hardware. In the example of FIG. 1, FOTA hardware 110 is dedicated hardware for FOTA updates, where the updates are performed by writing values such as machine code instructions, data, and/or configuration values to one or more banks 162, 163 of external memory 160 via memory controller 120.

FOTA hardware 110 includes multiple different hardware logic components 111-114, which may or may not be distinctly physically separate. FOTA processing unit 111 may include hardware logic configured to execute FOTA-specific firmware and, thus, to perform the actions of FIG. 4. In this example, FOTA-specific firmware may provide functionality to write updated firmware for the SoC 101 onto one or more banks 162, 163 of the external memory 160. The other components 112-114 support writing the updated SoC firmware by reducing or eliminating actions that would otherwise cause XIP processing to be delayed.

Wait state hardware logic 112 may put the FOTA processing unit 111 in a wait state during certain times. Examples of such times may include hardware actions requested by the FOTA firmware. Putting the FOTA processing unit 111 into a wait state may include exchanging signals between the wait state hardware logic 112 and the FOTA processing unit 111 to cause the FOTA processing unit 111 to pause executing update instructions. Bus access hardware logic 113 may arbitrate for bus access on behalf of the FOTA processing unit, and bus initiator circuitry 114 may change settings of the memory controller 120 on behalf of the FOTA processing unit for reads and writes to and from the external memory 160. Functionality of the hardware logic components 112-114 is discussed in more detail with respect to FIG. 4.

FIG. 2 is a block diagram of a portion of the system 100 of FIG. 1, according to various embodiments. The FOTA processing unit 111 initiates read operations and write operations to the memory controller 120 in part by requesting bus access to the configuration bus 213 and to the data bus 212, which serve the memory controller 120. For instance, the FOTA processing unit 111 may make configuration changes to the memory controller 120 to initiate read or write operations by putting appropriate signals onto the configuration bus 213. Also, in this example, the FOTA processing unit 111 may read or write the data itself via bus 212. Access to the bus 213 is arbitrated with SoC configuration bus at least in part by bus access hardware logic 113. Similarly, access to the bus 212 is arbitrated with the SoC data bus at least in part by bus access hardware logic 113. The bus access arbitration is illustrated in FIG. 2 as a multiplexing or demultiplexing action; however, arbitration may be performed in any appropriate manner.

Data and configuration bus initiator hardware logic 114 sends signals on behalf of the FOTA processing unit 111 to the memory controller 120. For instance, the bus initiator hardware logic 114 may include configuration initiator circuitry 114*a* that provides configuration changes, under control of FOTA processing unit 111, transmitting signals on configuration bus 213. Similarly, the bus initiator hardware logic 114 may include data initiator circuitry 114*b* that reads or writes data via bus 212. In one example, the processor cores 102-103 (FIG. 1) perform XIP reads over data bus 212, and the data that is read may be put on the SoC data bus, then to the interconnects 105 and onto an appropriate one of the processor cores 102, 103. In this example, the XIP read is a read operation of currently-installed firmware stored to bank 1 163 of the external memory 160.

In another example, the FOTA processing unit 111 may perform a FOTA write to update firmware in bank 0 162 of the external memory 160. The FOTA write operations may be performed during runtime of an older copy of the firmware on bank 1 163 via XIP, as explained in more detail with respect to FIG. 4. A FOTA update may include a write status check to determine whether a requested write operation has been performed. The write status check may be performed by the FOTA processing unit 111, communicating with the configuration status module 261 over configuration bus 213. A FOTA update may also include a FOTA read back, in which the FOTA processing unit 111 reads the data written to bank 0 162 to ensure that the data was written correctly. The FOTA read back may be performed over data bus 212.

In the present example, the memory controller 120 includes one or more memory mapped registers 221. However, the scope of implementations may include any appropriate architecture and operation for memory controller 120.

Wait state logic 112 may determine when the FOTA instructions, running on a FOTA circuitry 111, have caused a hardware action (e.g., requested bus access, changed a configuration setting of memory controller 120, or the like) or has initiated a write operation to external memory 160. Wait state logic may be configured to put FOTA circuitry 111 in a wait state while hardware actions are being performed in order to avoid polling, which would otherwise increase XIP downtime. For instance, wait state logic 112 may communicate with FOTA processing unit 111, bus initiator circuitry 114, and/or bus access hardware logic 113. Wait state logic 112 may also send and receive hardware-level signals on one or more buses (not shown) to determine when a hardware action has been completed or a write status check has been completed.

Also, as explained in more detail below, FOTA processing unit 111 may also execute code to provide an adaptive wait state. An example may include a predictive model or another algorithm to determine an approximate time for completion of a write operation.

FIG. 3 is an illustration of an example method 300, to perform a FOTA operation, according to various embodiments. Method 300 may be performed by one or more processors, such as processor cores 102-103 (FIG. 1), executing FOTA update software. For instance, one or more of the processor cores 102-103 may read computer-executable code from a memory (internal memory 104 and/or external memory 160) and may then execute that code to provide the functionality described with respect to FIG. 3.

Action 302 may include providing at least a portion of a new firmware to FOTA hardware 110 for writing in external memory 160. In some examples, this includes writing the portion of the new firmware to an FOTA write buffer included in FOTA hardware 110 or in another appropriate location. In any event, action 302 may include the processor core(s) 102-103 dividing a FOTA package, that includes the new firmware, into a plurality of pages. For instance, some example pages are 256 bytes, and a FOTA package may be multiple kilobytes or even multiple megabytes in size, and action 302 may include creating multiple pages from a single FOTA package. The scope of implementations is not limited to any sized page, as 256 bytes is an example, and other implementations may be adapted for different sized pages as appropriate. The data that is written in action 302 may include one of those pages of data.

Action 304 includes the processor core(s) 102-103 communicating to the FOTA hardware 110 to write the portion of the new firmware to the external memory 160. In the example of method 300, action 304 includes the processor core(s) 102-103 instructing the FOTA hardware 110 which addresses to write (write addr) and a size of a page (bytecnt). Action 304 may also include a handshake (fota_ctrl go) with the FOTA hardware 110.

In response to action 304, the FOTA hardware 110 performs the actions of method 400 (FIG. 4). At actions 306 and 308, the FOTA update software executing on the processor core(s) 102-103 waits to receive an indication from the FOTA hardware 110 that the page write operation has been completed and that the status check indicates a correct write. Actions 306 and 308 are performed based upon information received from the FOTA hardware 110. The processor core(s) 102-103 may execute other instructions associated with other tasks while waiting actions 306 and 308 to successfully complete. Action 309 implements a loop so that any remaining pages of the new firmware are written in the same way and, once all the pages have been written, the FOTA write operation is completed.

Method 300 may be performed during runtime and, more specifically, as one or more of the processor cores 102-103 are executing SoC firmware via XIP operation. In that regard, the processor cores 102-103 may utilize an older version of the firmware on a first bank (e.g., bank 163) of the external memory 160 to perform the writing of the new firmware to a second bank (e.g., bank 162) and/or to execute other instructions during the firmware update. Using FIG. 2 as an example, the page may be written to bank 0 162 of the external memory 160, and the XIP reads may still be performed from bank 1 163. Even though the actions may be interleaved, they may appear to peripheral devices as being performed concurrently. Furthermore, once the FOTA update has been completed, then the SoC 101 may reboot and then begin performing XIP reads from bank 0 162, and a subsequent FOTA update (if any) may be performed on bank 1 163. Also, method 300 illustrates that in some examples FOTA update may have actions that are distributed among software (running on one or more of the processor cores 102-103) and FOTA update firmware that is running on dedicated FOTA hardware (e.g., FOTA hardware 110).

FIG. 4 is an illustration of method 400, for performing a FOTA update, according to various embodiments. Method 400 may be performed by a processing unit, such as FOTA processing unit 111 (FIG. 1) as it executes computer-readable code to provide the illustrated functionality. In one example, FOTA processing unit 111 may execute FOTA update firmware, which may be stored at FOTA hardware 110 or other appropriate location, and perform the actions of method 400. Of note is that the FOTA update firmware is different firmware than the SoC firmware, which is being updated. In other words, the SoC firmware may be executed by one or more of the processor cores 102-103 during runtime, and the FOTA update firmware may be run by the FOTA processing unit 111 to update the SoC firmware.

Action 402 may include receiving information from the software process of FIG. 3. For instance, the software process of FIG. 3 includes action 304 (configure write addr, bytecnt, set fota_ctrl go). The information from action 302 may be transmitted to the FOTA processing unit 111. The handshake at action 402 may begin a process of writing one page of the FOTA package.

Action 404 may include the FOTA processing unit 111 controlling the bus access hardware logic 113 to request the bus access. For instance, the FOTA processing unit 111 may signal to the bus access hardware logic 113 to acquire access to the configuration bus 213 and the data bus 212 (FIG. 2). In this example, the bus access hardware logic 113 may operate to reduce XIP downtime by avoiding interfering with XIP if possible. For instance, upon receiving a signal from the FOTA processing unit 111, the wait state logic 112 may signal to the FOTA processing unit 111 to pause execution of the FOTA update firmware. Then, if the bus access hardware logic 113 determines that XIP is active, the bus access logic 113 may keep the FOTA processing unit 111 paused until XIP becomes idle or until a timer is reached. Once XIP becomes idle, then the wait state logic 112 may signal to the FOTA processing unit 111 to resume execution of the FOTA update firmware.

The actions by the bus access hardware logic 113 may include requesting bus access and acquiring bus access in accordance with sending and receiving hardware-level signals. In one example, the bus access hardware logic 113 may send and receive hardware-level signals with hardware that implements the multiplexor functionality of FIG. 2. For instance, the bus access hardware logic 113 may send a Request signal to request access to the bus and receive a Grant signal indicating that access is granted.

Action 406 may include the FOTA processing unit 111 requesting access to the data and configuration buses (e.g., 212 and 213) by, e.g., setting values in a special function register (SFR) or other appropriate technique to identify the buses. In response, the bus access hardware logic 113 may then grant access to the specific buses.

Action 408 may include the FOTA processing unit 111 writing to configuration registers in the memory controller (e.g., 120). Action 408 may include the FOTA processing unit 111 writing to a SFR or other appropriate technique to trigger configuration bus initiator logic 114*a* to change settings of the memory controller to cause the memory controller to change from read settings to write settings. The configuration bus initiator logic 114*a* may change settings of the memory controller 120 via, e.g., bus 213.

Action 410 includes the wait state logic 112 pausing the FOTA processing unit 111 during action 408. Once the configuration bus initiator logic 114*a* determines that the settings have been changed, the configuration bus initiator logic 114*a* may communicate with wait state logic 112 to indicate completion of the setting changes. In response, the wait state logic 112 may signal to the FOTA circuitry 111 to restart the FOTA update firmware.

Action 412 may include the FOTA processing unit 111 triggering the data bus initiator logic 114*b* to move the page of data to the memory controller 120 via, e.g., bus 212. Action 412 is accompanied by action 414, in which the wait state logic 112 signals to the FOTA processing unit 111 to pause execution of the FOTA update firmware. Once the data has been moved to the memory controller 120, the data bus initiator logic 114*b* may signal to the wait state logic 112 that the write operation is complete. In response, the wait state logic 112 may then signal to the FOTA processing unit 111 to restart execution of the FOTA update firmware.

Actions 416 and 418 may include the FOTA processing unit 111 communicating with the configuration bus logic 114*a* to revert the memory controller settings to read settings from write settings and to communicate with the bus access hardware logic 113 to release access to the data and configuration buses 212, 213.

Although not shown in FIG. 4, the memory controller 120 may perform lower-level operations to write the page of data to memory cells in a bank of the external memory 160 (e.g., bank 0). The writing operation to the memory cells may take an amount of time that depends upon characteristics, such as age of the device, operating temperature, and the like. In some examples, flash write completion may take between 120 μs and 2 ms—over an order of magnitude difference. Of course, this is just an example, and various applications may have different ranges of flash write completion times. In any event, a variation that may be over an order of magnitude may present challenges in some systems.

For instance, the FOTA update firmware (executed by the FOTA processing unit 111) may be programmed to poll the memory controller 120 to determine when the data has been written to the flash memory cells of external memory 160. In one example, the FOTA processing unit 111 may not wait for that entire 2 ms for the data to be written. Rather, the FOTA processing unit 111 may determine whether controller data lines have become idle, so that XIP read operations from bank 1 163 may be resumed. Further in this example, write operations to flash bank 0 162 may still occur in the background by virtue of RWW flash, which may perform read from a bank while write is happening to another bank.

The polling discussed above may preclude XIP read operations during duration of the polling. In other words, over-polling may decrease XIP throughput unnecessarily. Under-polling may allow XIP read throughput at the expense of FOTA update write throughput.

The embodiment of FIG. 4 attempts to balance XIP read throughput and FOTA update write throughput by use of an adaptive timer at action 420. For instance, the FOTA update firmware (executed by the FOTA processing unit 111) may set a polling timer based on an estimate of write completion time. A duration of the polling timer may be set by any appropriate technique that may take into account the variability in write completion time. For instance, during runtime, the FOTA update firmware may run one or more algorithms that take into account age of the device, operating temperature, historical write completion times, and/or any other relevant factors to generate an estimate of write completion time.

In one example, the FOTA update firmware may generate the estimate of write completion time from a Kalman filter that receives as input historical data for recent write completion times and device age. The Kalman filter may then generate the estimate of write completion time based on that input. In another example, the FOTA update firmware may use a trained artificial intelligence (AI) or machine learning (ML) algorithm (e.g., deep learning) to determine estimated write completion time from historical write completion times and/or current operating parameters such as device age and operating temperature. The scope of implementations is not limited to any particular technique to generate the estimate of write completion time. Rather, the scope of implementations may be adapted to use any estimate of write completion time that may be generated adaptively and based on system operating characteristics. Examples of system operating characteristics may include device age, detected system operating temperature, detected write completion time of previous write operations, and the like.

Thus, various embodiments may implement a variable polling timer at action 420, where the variable polling timer is based on an estimate of write completion time. As a result, method 400 may reduce an amount of over-polling and under-polling to balance XIP read throughput and FOTA update write throughput, thereby increasing an efficiency of operation of the system 100 (FIG. 1).

Once the polling timer has elapsed at action 422, then the FOTA processing unit 111 may begin a polling action. The polling action may start by bus access arbitration, gaining access to the configuration and data buses, and writing memory controller configuration registers at actions 424-428. Actions 424-428 are the same as or similar to actions 404-408. For instance, during bus access arbitration at actions 404, 424, the wait state logic 112 causes the FOTA processing unit 111 to pause execution of the FOTA update firmware. The wait state logic 112 then causes the FOTA processing unit 111 to restart execution of the FOTA update firmware only after the wait state logic 112 determines that the requested hardware event has been completed. The wait state logic 112, perhaps in coordination with the other hardware components 113 and 114, may monitor buses for hardware-level signals to determine completion of hardware events.

In other words, the FOTA processing unit 111 pauses and restarts associated with actions 404, 424 may be controlled by hardware logic and may be based on hardware-level signals from bus hardware, the memory controller, or from any other appropriate component. The same is true for pauses and restarts associated with actions 410, 414, 430, 434 as well. Thus, the FOTA processing unit 111 may omit polling for completion of hardware events (e.g., bus access arbitration, configuration changes at memory controller, moving data to the memory controller, issuing status read commands, and the like).

The FOTA processing unit 111 uses a write operation to change configuration settings of the memory controller 120 from read settings to write settings at action 428. The wait state logic 112 pauses the FOTA processing unit 111 until it determines that the memory controller has completed configuration setting changes at action 430.

Actions 432, 434 issue a status read command the external memory 160. The FOTA processing unit 111 first configures registers in the memory controller 120, which in turn causes the memory controller 120 to send out a command sequence to memory 160 to read the flash status register (432). This flash status register determines whether the flash page program has been completed or not. At action 434, the FOTA processing unit 111 polls whether this status read command has been sent out from the memory controller to the external memory 160.

Actions 436 and 438 are the same as or similar to actions 416, 418. However, action 436 includes the FOTA processing unit 111 updating the prediction model that was used at action 420. Action 440 includes the FOTA processing unit 111 parsing a returned signal indicating a result of the status request. In some examples, the result of the status request may indicate completion or lack of completion of the data write to the memory cells of the external memory 160. If the page of data has not yet been written to the cells of the external memory 160, then method 400 may return to action 422. If the page of data has been written to the cells of the external memory 160, then the FOTA processing unit may communicate with the software process of method 300 to indicate that the page of data has been written to the external memory 160.

As noted above, there may be further pages to write to the external memory 160. The software process of method 300 may then restart method 400 by a handshake (action 402) and a further page of data or may end the FOTA update process if no further pages are to be written.

FIG. 5 is an illustration of an example method 500, which may be performed by FOTA hardware 110 of FIG. 1, according to various embodiments. Specifically, the different actions of method 500 may be performed as FOTA processing unit 111 executes computer-readable code to provide the functionality of FOTA update firmware.

Action 502 includes initiating a first data write operation. For instance, action 502 may include communicating with another process, such as a software process, to begin writing a page of data as part of a firmware update operation. In some examples, action 502 may include requesting bus access arbitration from a supporting hardware logic, such as at action 404 of FIG. 4.

Action 504 includes controlling first hardware logic to change a memory controller to a first memory controller setting. In one example, FOTA update firmware may control configuration bus logic to write configuration settings to a memory controller. For instance, the configuration settings may change read operation settings to write operation settings at the memory controller. An example is discussed above with respect to action 408 of FIG. 4.

Action 506 includes entering and exiting a wait state under control of second hardware logic. For instance, FOTA update firmware may be run on a processor core, such as FOTA processing unit 111, and supporting hardware logic, such as wait state logic 112, may coordinate with FOTA processing unit 111 to cause FOTA processing unit 111 to pause and restart execution of FOTA update firmware. Wait state logic 112 may control a timing of the pause and restart based on observing hardware-level signals that indicate a request for writing to memory controller configuration registers and a completion of the writing. An example is discussed above with respect to action 410 of FIG. 4.

Action 508 includes controlling the first hardware logic to configure the memory controller to a second memory controller setting. For instance, action 508 may include reverting the memory controller settings from write operation settings to read operation settings. An example is discussed above with respect to actions 416 and 418 of FIG. 4. Action 508 may be performed subsequent to completing the write operation or, at least, subsequent to sending the firmware code over the data bus pursuant to the write operation.

Although not explicitly shown in FIG. 5, method 500 may include coordinating with other hardware logic to send data to the memory controller, thereby causing the memory controller to write data to memory cells. An example is shown above with respect to actions 412-414 of FIG. 4.

Action 510 includes polling the memory for completion of the first data write operation. The polling may be based on a polling timer. An example of a polling timer is discussed above with respect to actions 420, 422 of FIG. 4. Once again, the polling timer may be set adaptively so that it may vary from one write operation to another write operation even on the same external memory device. The polling timer may be set based upon an estimated write completion time, which is calculated by any appropriate technique. As noted above, the polling action may stop read throughput for XIP operations. Therefore, the polling timer may be set so that it balances read throughput and FOTA write throughput to the same memory device. An example of polling may include the actions 422-434 FIG. 4.

Action 512 includes controlling the first hardware logic to configure the memory controller settings after polling. For instance, the polling operation of action 510 may include a write operation from FOTA processing unit 111 to a memory controller, so action 512 may include changing configuration settings of the memory controller from write operation settings to read operation settings. An example is discussed above with respect to action 436 of FIG. 4.

Action 514 includes determining that a response to the polling indicates completion of the first write operation. For instance, the memory controller may answer a status request by issuing a signal, writing to a register, or other appropriate technique to indicate whether the data has been written to memory cells. The FOTA processing unit 111 may parse the indication to determine whether the data has been written to the memory cells or whether writing to the memory cells is in-process. An example is discussed above with respect to action 440 of FIG. 4.

Action 516 includes reporting completion of the first operation to software. For instance, the FOTA processing unit may report completion of a page write operation to the software process of FIG. 3. An example is discussed above with respect to action 442 of FIG. 4. Action 518 includes performing subsequent write operations. For instance, a FOTA update package may have been decomposed into multiple pages, and each one of those pages may be written to memory using an iteration of method 400. Action 518 in some examples includes performing method 400 to accommodate further page writes until the entirety of the FOTA update package has been written to memory.

At completion of method 500, a FOTA update package has been written to a bank of memory, such as bank 0 162 of the external memory 160 of FIG. 2.

The scope of implementations is not limited to the sequence of actions of method 500. Rather, some embodiments may add, omit, rearrange, or modify various actions. For instance, an SoC, which includes other processors to execute SoC firmware may reboot and then begin executing the updated firmware. For instance, if the updated firmware was written to bank 0 162 of the external memory 160, then after rebooting, the various CPUs of the SoC may then execute the firmware from bank 0 162 of the external memory 160.

Furthermore, it is noted that the actions discussed above with respect to FIGS. 3-5 to update firmware may be performed during XIP execution of existing firmware code. For instance, as noted above, bus arbitration may be performed so that bus access may be granted to FOTA update write operations and then bus access may be returned to accommodate XIP read operations. In other words, FOTA firmware update actions may be interleaved with XIP read operations, including arbitrating bus access and changing/reverting memory controller settings, so that FOTA firmware update may be performed during runtime of an SoC (e.g., system 100 of FIG. 1). As a result, FOTA firmware updates may be performed without causing noticeable or substantial SoC downtime, at least in some examples. Therefore, the FOTA update operations discussed above may be advantageously implemented within systems that seek to minimize downtime, such as in automotive applications or other applications.

Additionally, while the examples herein refer to FOTA updates, the principles may be adapted to update any kind of firmware or software updates, whether over the air or over a wired connection or otherwise. Put another way, the scope of implementations is not limited to FOTA updates, as other applications may update firmware over a wired connection, by direct memory access from another memory, or otherwise. Also, the scope of implementations may include updating higher-level application software or firmware in addition to or instead of SoC-level firmware.

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

The term "semiconductor die" is used herein. A semiconductor device can be a discrete semiconductor device such as a bipolar transistor, a few discrete devices such as a pair of power FET switches fabricated together on a single semiconductor die, or a semiconductor die can be an integrated circuit with multiple semiconductor devices such as the multiple capacitors in an analog-to-digital (A/D) converter. The semiconductor device may include passive devices such as resistors, inductors, filters, sensors, or active devices such as transistors. The semiconductor device may be an integrated circuit with hundreds or thousands of transistors coupled to form a functional circuit, for example a microprocessor or memory device. The semiconductor device may also be referred to herein as a semiconductor device or an integrated circuit (IC) die.

The term "semiconductor package" is used herein. A semiconductor package has at least one semiconductor die electrically coupled to terminals and has a package body that protects and covers the semiconductor die. In some arrangements, multiple semiconductor dies may be packaged together. For example, a power metal oxide semiconductor (MOS) field effect transistor (FET) semiconductor device and a second semiconductor device (such as a gate driver die, or a controller die) may be packaged together to from a single packaged electronic device. Additional components such as passive components, such as capacitors, resistors, and inductors or coils, may be included in the packaged electronic device. The semiconductor die is mounted with a package substrate that provides conductive leads. A portion of the conductive leads form the terminals for the packaged device. In wire bonded integrated circuit packages, bond wires couple conductive leads of a package substrate to bond pads on the semiconductor die. The semiconductor die may be mounted to the package substrate with a device side surface facing away from the substrate and a backside surface facing and mounted to a die pad of the package substrate. The semiconductor package may have a package body formed by a thermoset epoxy resin mold compound in a molding process, or by the use of epoxy, plastics, or resins that are liquid at room temperature and are subsequently cured. The package body may provide a hermetic package for the packaged device. The package body may be formed in a mold using an encapsulation process, however, a portion of the leads of the package substrate are not covered during encapsulation, these exposed lead portions form the terminals for the semiconductor package. The semiconductor package may also be referred to as a "integrated circuit package," a "microelectronic device package," or a "semiconductor device package."

What is claimed is:

1. A method comprising:

updating firmware by:

using a first processing unit, initiating a first data write operation to a memory via a memory controller, wherein the first data write operation is configured to write a portion of a first version of the firmware to a first bank of the memory;

determining a duration of a timer between the initiating of the first data write operation and polling to determine a status of the first data write operation;

during the duration of the timer, accessing a second version of the firmware from a second bank of the memory;

after expiration of the timer, using the first processing unit, polling the memory for completion of the first data write operation; and subsequent to the polling, determining whether a response to the polling indicates completion of the first data write operation.

2. The method of claim 1, wherein the first data write operation is associated with a firmware over the air (FOTA) update of the firmware.

3. The method of claim 1, wherein updating the firmware further comprises:

reporting completion of the first data write operation to a second processing unit, wherein the first processing unit and the second processing unit are separate processing units of a system on a chip (SoC);

receiving an instruction to perform a second data write operation, wherein the second data write operation is configured to write a further portion of the first version of the firmware to the first bank of the memory;

performing the second data write operation; and reporting completion of the second data write operation to the second processing unit.

4. The method of claim 1, further comprising:

setting the timer based on historical write completion data.

5. The method of claim 1, further comprising:

setting the timer based on historical write completion data and according to a Kalman filter.

6. The method of claim 1, wherein updating the firmware further comprises:

prior to writing the portion to the memory controller, accessing a data bus and a configuration bus, wherein the data bus and the configuration bus are configured to provide access to the memory controller; and subsequent to writing the portion to the memory controller, releasing access to the configuration bus and the data bus.

7. The method of claim 6, further comprising:

determining whether the configuration bus and the data bus are available for access by the first processing unit, including determining for a particular instruction cycle whether the configuration bus and the data bus are not used for reading the second version of the firmware.

8. The method of claim 6, further comprising:

during a wait state of the first processing unit, releasing access to the configuration bus and the data bus; and after exiting the wait state by the first processing unit, releasing access to the configuration bus and the data bus.

9. The method of claim 1, further comprising:

causing the first processing unit to enter a wait state during a time in which the memory controller changes to a first memory controller setting; and causing the first processing unit to exit the wait state subsequent to completion of the memory controller changing to the first memory controller setting.

10. A circuit device comprising:

a first processing resource coupled to an interconnect;

firmware update hardware coupled to the interconnect;

a memory; and a memory controller coupled to the firmware update hardware, the interconnect, and the memory, the memory controller being configured to read from and write to the memory;

wherein the firmware update hardware includes a second processing resource configured to access computer-readable code, which when executed by the second processing resource, causes the second processing resource to update firmware stored on the memory, including:

requesting access to a bus, wherein the bus is shared with the first processing resource and is coupled to the memory controller;

entering a wait state, under control of the firmware update hardware, during a time in which the firmware update hardware operates to receive access to the bus; and exiting the wait state, under control of the firmware update hardware, upon access to the bus being received.

11. The circuit device of claim 10, wherein the computer-readable code is operable to cause the second processing resource to update the firmware, including:

controlling the firmware update hardware to change settings of the memory controller to either allow the second processing resource to write to the memory or to allow the first processing resource to read from the memory; and entering the wait state, under control of the firmware update hardware, during a time in which the firmware update hardware makes changes to the settings of the memory controller.

12. The circuit device of claim 10, wherein the second processing resource is further configured to:

initiating a first data write operation to the memory;

pausing execution of the computer-readable code, under control of the firmware update hardware, during a time in which the first data write operation is being completed;

restarting execution of the computer-readable code; and polling the memory controller for status of the first data write operation.

13. The circuit device of claim 12, wherein the computer-readable code is operable to cause the second processing resource to update the firmware, including:

programming a timer, according to an adaptive algorithm and historical data, wherein a timing of the polling is performed according to the timer.

14. The circuit device of claim 12, wherein the computer-readable code is operable to cause the second processing resource to update the firmware, including:

programming a timer, according to a Kalman filter, wherein a timing of the polling is performed according to the timer.

15. The circuit device of claim 10, wherein the memory controller comprises a flash memory controller configured to read from and write to the memory according to transactions from the first processing resource and the second processing resource.

16. The circuit device of claim 10, wherein the first processing resource is configured to execute further computer-readable code to cause the first processing resource to trigger the second processing resource to initiate a second data write operation after completion of a first data write operation that is associated with access to the bus.

17. A system comprising:

a first processing resource coupled to an interconnect;

a memory;

firmware update hardware that includes a second processing resource configured to execute computer-readable code, which when executed by the second processing resource causes the second processing resource to update firmware stored on the memory; and a memory controller coupled to the firmware update hardware, the interconnect, and the memory, the memory controller being configured to read from and write to the memory;

wherein the firmware update hardware is configured to:

receive a first instruction from the second processing resource to access a bus, wherein the bus is shared with the first processing resource and is coupled to the memory controller;

cause the second processing resource to enter a wait state coinciding with a time in which the firmware update hardware operates to receive access to the bus; and cause the second processing resource to exit the wait state in response to access to the bus having been received.

18. The system of claim 17, wherein the firmware update hardware is further configured to:

receive a second instruction from the second processing resource to change a setting on the memory controller from read operation to write operation;

cause the second processing resource to enter the wait state coinciding with a time in which the firmware update hardware operates to change the setting; and cause the second processing resource to exit the wait state in response to determining that the setting has been changed.

19. The system of claim 18, wherein the firmware update hardware is configured to determine that the setting has been changed by receiving a hardware-level signal from the memory controller.

20. The system of claim 17, wherein the firmware update hardware is configured to determine that access to the bus has been received in response to a hardware-level signal.

* * * * *